United States Patent
Jiang et al.

(10) Patent No.: US 12,112,465 B2
(45) Date of Patent: Oct. 8, 2024

(54) FULL-FIELD MEASUREMENT AND RECONSTRUCTION METHOD FOR TURBINE BLADE STRAIN FIELD BASED ON DUAL-MODE FUSION

(71) Applicant: University of Electronic Science and Technology of China, Sichuan (CN)

(72) Inventors: Jing Jiang, Sichuan (CN); Yi Niu, Sichuan (CN); Chao Wang, Sichuan (CN); Peifeng Yu, Sichuan (CN); Zezhan Zhang, Sichuan (CN); Shan Gao, Sichuan (CN)

(73) Assignee: University of Electronic Science and Technology of China, Sichuan (CN)

( * ) Notice: Subject to any disclaimer, the term of this patent is extended or adjusted under 35 U.S.C. 154(b) by 363 days.

(21) Appl. No.: 17/719,888

(22) Filed: Apr. 13, 2022

(65) Prior Publication Data
US 2022/0237766 A1   Jul. 28, 2022

(30) Foreign Application Priority Data
Apr. 13, 2021   (CN) .......................... 202110394021.6

(51) Int. Cl.
G06T 7/00       (2017.01)
G01B 11/16      (2006.01)
G01J 5/00       (2022.01)
G06T 7/73       (2017.01)

(52) U.S. Cl.
CPC ............ *G06T 7/0002* (2013.01); *G01B 11/16* (2013.01); *G01J 5/0088* (2013.01); *G06T 7/73* (2017.01); *G06T 2207/20021* (2013.01); *G06T 2207/30164* (2013.01)

(58) Field of Classification Search
CPC ... G06T 7/0002–001; G01B 11/16–165; G01J 5/0088
See application file for complete search history.

(56) References Cited

U.S. PATENT DOCUMENTS

| | | | |
|---|---|---|---|
| 2012/0293647 A1* | 11/2012 | Singh ..................... | G01K 11/20 29/829 |
| 2014/0267693 A1* | 9/2014 | Newman ............... | G06T 7/0004 348/128 |
| 2016/0314571 A1* | 10/2016 | Finn ...................... | G06T 7/0004 |
| 2017/0011503 A1* | 1/2017 | Newman ................ | G01N 25/72 |
| 2019/0072082 A1* | 3/2019 | Lysgaard ................ | G06T 7/001 |
| 2019/0370999 A1* | 12/2019 | Liu .......................... | G06T 7/13 |
| 2022/0237766 A1* | 7/2022 | Jiang ......................... | G06T 7/73 |

FOREIGN PATENT DOCUMENTS

CN          110082355 A   *   8/2019

* cited by examiner

Primary Examiner — Sean T Motsinger

(57) ABSTRACT

A measurement and reconstruction method for a turbine blade strain field of with integrates an imaging technology and an infrared photoelectric measurement technology. The imaging technology is mainly responsible for the measurement of the strain field on a target blade surface, so as to use a digital image processing technology to obtain blade strain field data. The infrared photoelectric measurement technology is mainly aimed at the strain at blade edges, which uses temperature difference between the blade edges and blade gaps to perform strain measurement. Measurement results of the two modes are finally converted into blade strain parameters, thereby reconstructing the target blade strain field based on host computer software.

6 Claims, 5 Drawing Sheets

FULL-FIELD MEASUREMENT AND RECONSTRUCTION METHOD FOR TURBINE BLADE STRAIN FIELD BASED ON DUAL-MODE FUSION

CROSS REFERENCE OF RELATED APPLICATION

The application claims priority under 35 U.S.C. 119(a-d) to CN 202110394021.6, filed Apr. 13, 2021.

BACKGROUND OF THE PRESENT INVENTION

Field of Invention

The present invention relates to a technical field of aero-engine turbine blade strain measurement and its data processing, which is for full-field strain measurement of turbine blades and strain field reconstruction.

Description of Related Arts

The strain state of turbine rotor blades during working of an aero-engine is one of the key parameters for studying the mechanical properties of the engine turbine blades, evaluating the working state of the blades, and improving the blade structure. Blade strain measurement and strain field reconstruction are the key and difficulty in the field of aero-engine turbine blade testing. The conventional high-temperature strain gauge method is a point-to-point contact measurement method, which is complicated in installation and wiring, difficult to reconstruct the strain field, and low in upper limit of application temperature. Such issues have seriously hindered the study of the stress and strain state of the turbine rotor blades under high temperature and high pressure.

To solve such issues, the present invention provides a full-field reconstruction method for a turbine blade strain field based on dual-mode fusion, which is based on optical non-contact measurement. With a combination of infrared acquisition and imaging technology, strain measurement is performed at edges and surfaces of turbine blades. Then data of the two modes are combined according to surface characteristics of the blades to reconstruct the full-field strain of the blade.

SUMMARY OF THE PRESENT INVENTION

The present invention combines imaging technology and infrared photoelectric strain measurement technology, and uses the same optical path and non-contact measurement of the same probe to realize measurement and reconstruction of an entire strain field of the same target blade, which solves problem that conventional turbine rotor blade strain measurement has too few data points to form field measurement.

The present invention integrates two measurement methods, providing an imaging measurement mode and an infrared measurement mode. The present invention uses one probe to realize simultaneous collection of digital image signals and infrared signals, and centrally processes the signals in a host computer system. The probe has two functions: telescoping and rotating. The telescoping function means that during collecting blade optical information, the probe will move up and down in a reserved hole on an engine casing. During movement, a light hole of the probe can radially cover multiple target areas of the blade. The rotating function refers to adjustment of the probe based on preliminary relative positional relationship between the light hole and the target blade before the telescoping process of the probe, so as to satisfy arc-shaped focal length adjustment of different blade areas. The imaging measurement mode of the probe is based on a charge-coupled device CCD connected to a rear end of a bi-telecentric optical system. The charge-coupled device CCD works outside the engine casing. Because of limitations of the light hole and the view field of the probe imaging system, a view field of the imaging measurement mode is not enough to directly record the entire blade area. Therefore, the same blade area is imaged multiple times through the telescoping function of the probe cooperating with a blade rotation speed sensor. It is difficult to make feature points at blade edges, so strain calculation accuracy is not high in the imaging mode. Therefore, the infrared mode is used for the blade edge. During the telescoping and rotating processes of the probe, the infrared mode can continuously record. After one telescoping displacement of the probe, an infrared radiation signal of the blade is transmitted to the infrared photodetector at the rear end through the probe, so as to record a converted voltage signal. The infrared radiation signal is collected based on rotation of the blade. After the probe reaches a certain height, the rotation of the blade and the infrared radiation difference between the blade and the surrounding environment will cause periodic changes of a collected voltage signal. A width of a periodic signal of the blade can be determined through accurate identification of the infrared radiation difference, which means that an axial displacement change of the blade can be calculated according to a recorded time difference together with steady-state rotation of the blade.

The present invention provides is a full-field measurement and reconstruction method for a turbine blade strain field based on dual-mode fusion. The full-field measurement and reconstruction method uses a probe, which can simultaneously collect optical information and infrared information, to collect turbine blade data. The probe has telescoping and rotating functions, and a telescoping direction is consistent with a turbine radial direction. The full-field measurement and reconstruction method comprises steps of:

Step 1: dividing a surface of a turbine blade into several rectangular areas, and pre-calculating acquisition angles and telescoping amounts of a probe when collecting optical information of the rectangular areas;

Step 2: when a turbine works, using the probe to collect the optical information of the rectangular areas of the turbine blade according to the acquisition angles and the telescoping amounts pre-calculated in the Step 1;

Step 3: splicing the obtained optical information of each area of the turbine blade to obtain a complete turbine blade image;

Step 4: fixing the telescoping amount of the probe, and collecting infrared information changes of the blade surface and blade gaps of the turbine blade at a certain speed and a certain height; converting an infrared signal into a continuous voltage signal based on a photoelectric converter, then outputting and storing the continuous voltage signal; obtaining edge information of the same turbine blade under different telescoping amounts of the probe with the same method;

Step 5: using the Steps 1-4 to obtain accurate turbine blade images at different temperatures;

Step 6: processing data, wherein first, the blade optical image spliced in the Step 3 is subjected to grayscale conversion, Gaussian high-pass filtering, and histogram equalization based on MATLAB software for image enhancement, so as to increase contrast between blade surface feature points and background in the image; second, image sub-areas are matched; a normal temperature image is used as a reference image, marked as f(x,y), and a high temperature image is used as a target image, marked as g(x',y'); x,y are coordinates of a feature point, f(x,y) and g(x',y') are gray values of corresponding feature points; a correlation function is used to find a position and a shape of a target sub-area with a highest similarity to the a reference sub-area, in which a cross-correlation function is specifically used to take maximum value between the target sub-area and the reference sub-area; at the same time, a search process of a target image sub-region uses a Newton-Rapshon algorithm combined with bicubic interpolation to achieve sub-pixel level matching accuracy; full-field displacement field changes are obtained based on the high-accuracy matching of a target image and a reference image, and a local least squares fitting method is used to preform full-field strain measurement; third, blade edge information is processed; through reasonable path planning and infrared signal scanning, a continuous signal curve of the voltage converted from the infrared signal of the blade at different temperatures and different heights is obtained; a blade width can be detected by the infrared intensity difference between the blades and the blade gaps with a slope threshold value of a setting voltage signal; blade edge strain change can be calculated by comparing blade width changes at different temperatures but same height; and Step 7: fusing the blade full-field strain information of the obtained by the image mode with the blade edge information based on continuity of the blade strain changes together with a spline interpolation algorithm, thereby reconstructing complete strain field information of the blade.

Beneficial effects of the present invention are as follows: the present invention combines digital image technology with infrared photoelectric measurement technology, which not only realizes the strain measurement of the turbine rotor blade at harsh high temperature and high pressure environment of the aeroengine, but also reconstructs the blade strain field based on methods such as data processing and image splicing. Compared with conventional reconstruction methods based on limited point data and software simulation, the method of the present invention performs interpolation reconstruction based on actual measurement results, and the reconstructed strain field has more engineering significance.

Element reference: 1. Dual-mode probe; 2. Dual-mode optical path; 3. Engine casing wall; 4. Engine shaft; 5. Turbine blade; 6. Probe telescoping function; 7. Imaging sub-area; 8. Imaging optical path; 9. Blade sub-area; 10. Probe rotating function; 11. Blade sub-area feature image; 12. Infrared optical path; 13. Infrared radiation scanning; 14. Infrared photoelectric scanning signal; 15. Feature image strain calculation; 16. Reference sub-area; 17. Target sub-area; 18. Dual-mode data fusion; 19. Strain field reconstruction.

DETAILED DESCRIPTION OF THE PREFERRED EMBODIMENT

Figure 1:
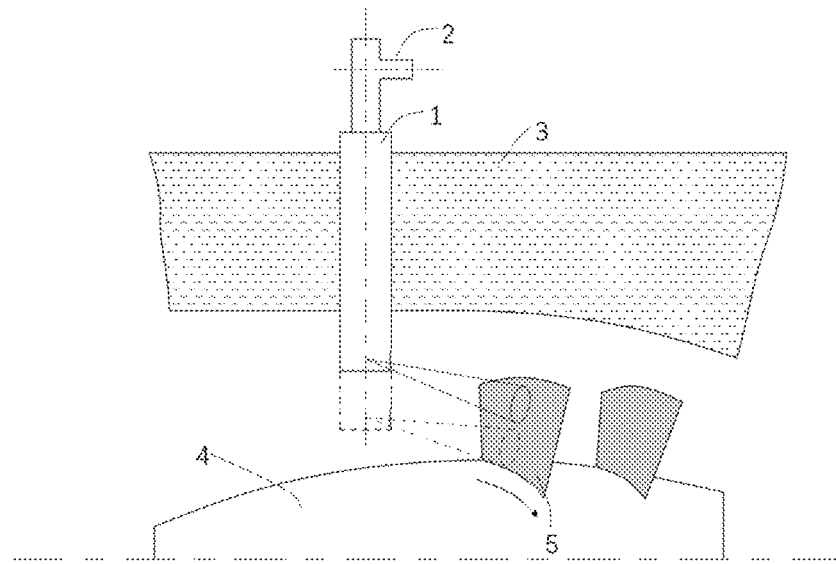
FIG. 1 is a sketch view of turbine blade strain field measurement.

Referring to FIG. 1, a dual-mode probe 1 enters an interior of an engine through a reserved hole on an engine casing wall 3. The engine casing wall 3 comprises an engine shaft 4 and turbine blades 5. The turbine blades 5 rotate with a high speed in a high-temperature and high-pressure gas environment, so as to rotate the engine shaft 4. The dual-mode probe 1 puts a probe into the engine for sensing, and the probe communicates with a light hole through a reflector, in such a manner that blade optical information is transmitted along a probe tube into a dual-mode optical path 2 at a rear end of the dual-mode probe 1. The dual-mode optical path 2 comprises an imaging optical path 8 and an infrared optical path 12.

Figure 2:
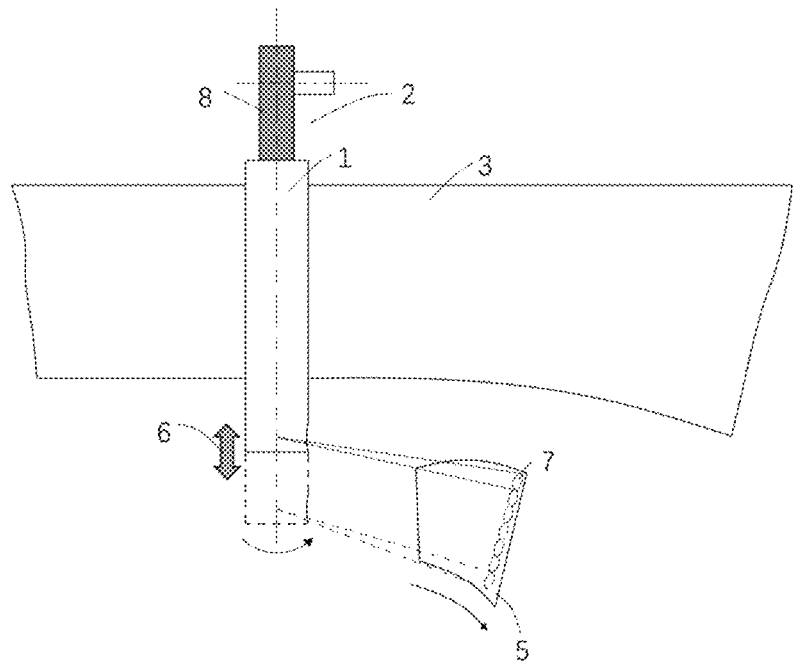
FIG. 2 illustrates strain measurement in a probe imaging mode.
Figure 3:
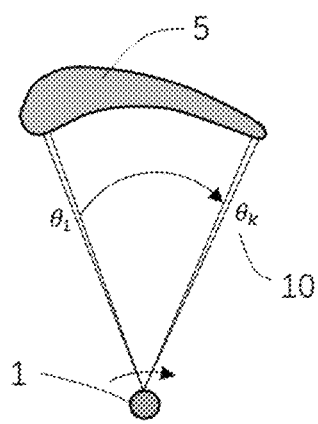
FIG. 3 is a sketch view of a probe rotating measurement function.
Figure 4:
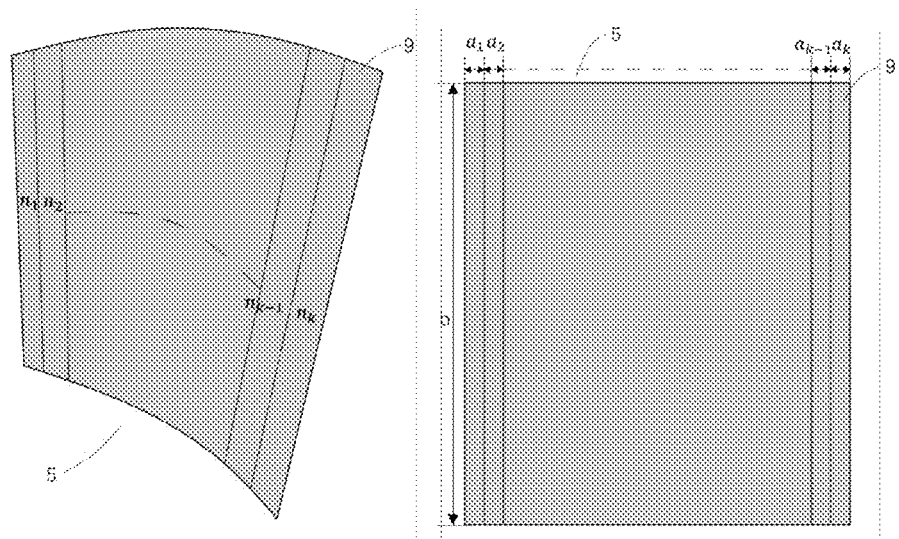
FIG. 4 is diagram of turbine blade area division.
Figure 5:
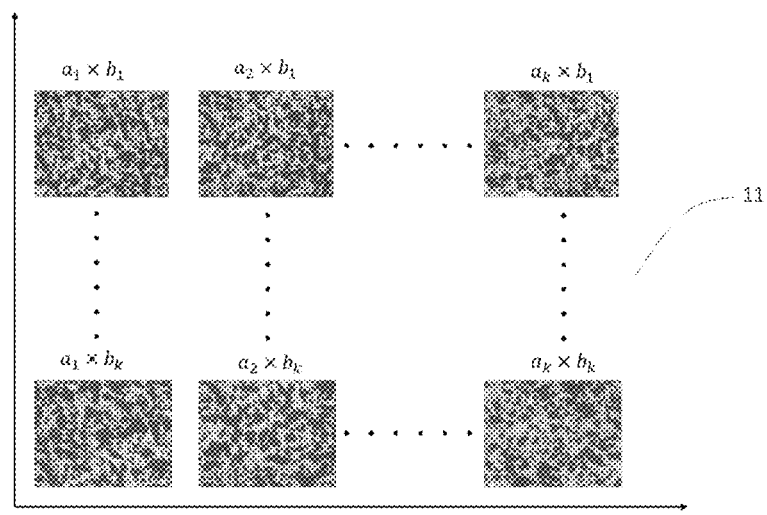
FIG. 5 is a digital image array of blade sub-areas.
Figure 6:
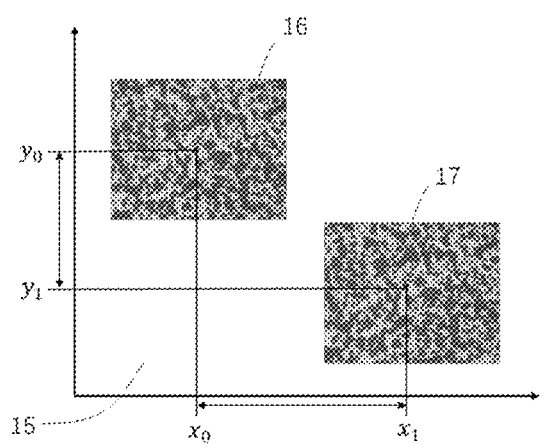
FIG. 6 is a sketch view of strain measurement principle of a turbine blade digital image.

Aero-engine turbine blades work in an extreme environment with high temperature and high pressure. However, during steady-state operation of the engine, the turbine blades can be considered as in a steady state due to an overall steady state of gas temperature, pressure, and the engine, wherein load and strain are in dynamic balance. That is to say, during measurement, a strain field of the turbine blades does not change rapidly with rotation. Referring to FIG. 2, the probe performs blade strain measurement based on the imaging optical path 8. The imaging optical path 8 comprises a bi-telecentric optical path for imaging on a charge-coupled device CCD at a rear end of the optical path through receiving the blade optical information reflected by a reflector at a probe position of the dual-mode probe 1. An imaging sub-area 7 is an area where the dual-mode probe 1 can clearly image a part of the blade under a limitation of an imaging view field, and an effective imaging area is recorded as a×c. Before probe measurement, the blade is evenly divided into $n_i$(i=0, 1, 2 . . . k) rectangular areas according to blade surface topography and a width a of an imaging view angle, as shown in FIG. 4, wherein a rectangular area is a×b, and each rectangular area corresponds to a probe angle $\theta_j$(j=0, 1, 2 . . . k). The probe activates a probe telescoping function 6 at an initial position, and records image every time after moving by a distance d. When a downward telescoping distance is b, the probe starts to return, in which the probe records image every time after moving by a distance d. When the probe returns to the initial position, a probe rotating function 10 is activated, as shown in FIG. 3, wherein a rotation angle is $\theta_{i+1}-\theta_j$. After that, another telescoping step is performed to measure the second rectangular area, thereby forming a blade sub-area digital image array as shown in FIG. 5. The image array can record the images under different working environments of the blade sub-areas containing feature points. A strain measurement principle based on digital images are shown in FIG. 6. A square reference sub-area 16 centered on a certain point ($x_0$, $y_0$) is selected from a reference image, so as to find a target sub-area 17 at a best matching position in a target temperature image with the help of image gray information and a correlation function. Based on past data experience of blade strain under high temperature, an accurate initial value of blade displacement can be estimated with a whole pixel displacement search method to optimize the correlation function. A distribution relationship between full-field pixel points of the target sub-area 17 and the correlation coefficient is established, which is corresponding points correlation evaluation between the reference sub-area 16 and the target sub-area 17, to realize accurate matching of the image sub-areas before and after deformation. A sub-pixel displacement measurement algorithm in photometric digital image processing field is used to calculate displacement components ($x_1-x_0$, $y_1-y_0$) of a corresponding point ($x_1$, $y_1$) of the target sub-area 17 in a x direction and ay direction relative to a reference sub-area point ($x_0$, $y_0$). In the same way, sub-area displacement changes can be calculated. The displacement change corresponding to the target sub-area 17 is converted into an image displacement vector diagram, which is combined with blade pixel point information to splice the displacement vector diagrams of multiple target sub-areas are spliced, so as to complete a blade surface displacement vector diagram.

Figure 7:
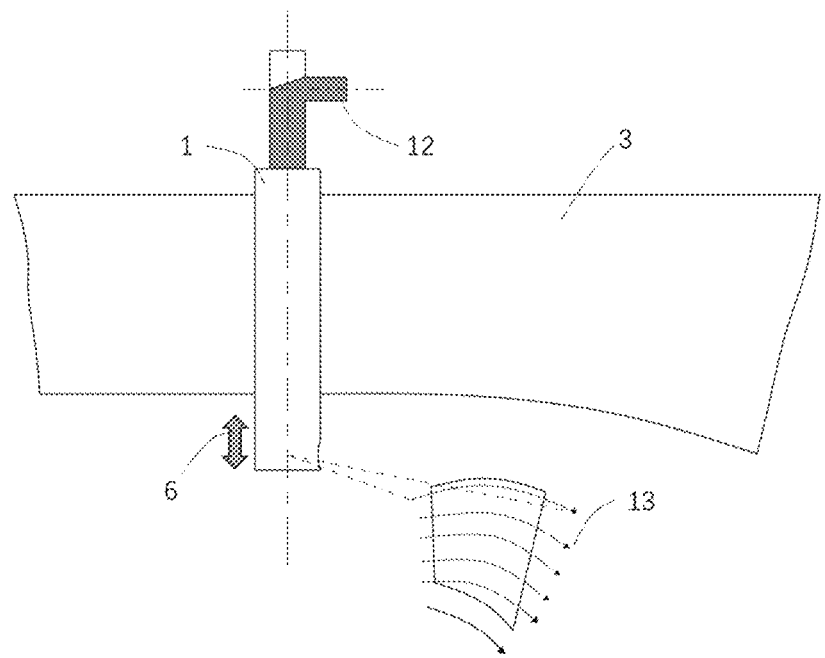
FIG. 7 illustrates strain measurement in a probe infrared photoelectric mode.

Blade edge strain measurement is shown in FIG. 7, wherein the dual-mode probe 1 mainly uses an infrared light path 12 in an infrared mode and cooperates with the probe telescoping function 6 to complete infrared radiation signal collection of the target blade. The reflector at the probe position of the dual-mode probe 1 reflects the blade optical information which is then split through a semi-transparent mirror at a joint between the optical path and the probe, in such a manner that the blade optical information is simultaneously transmitted to the infrared optical path 12 and the imaging optical path 8. The infrared light path 12 comprises a group of collimating lenses and a near-infrared band filter, wherein a rear end of the infrared light path 12 is connected to a refrigerated photodetector to convert blade infrared radiation signal into an electrical signal for outputting. In the infrared mode, the collection of the blade infrared radiation information cooperates with the probe telescoping function 6 of the dual-mode probe 1, in such a manner that in the first blade rotation cycle after the probe images at the displacement distance d, the photodetector of the infrared optical path 12 will start to work, so as to complete collection and identification of target blade infrared radiation information with the help of blade rotation and a speed sensor of the turbine blades. When the optical information received by the infrared optical path 12 transitions from the blade gaps to the blade surfaces and then from the blade surfaces to the blade gaps, a collected and converted infrared photoelectric scanning signal 14 will go up first and then go down due to temperature difference between the blade gaps and the blade surfaces.

Figure 8:
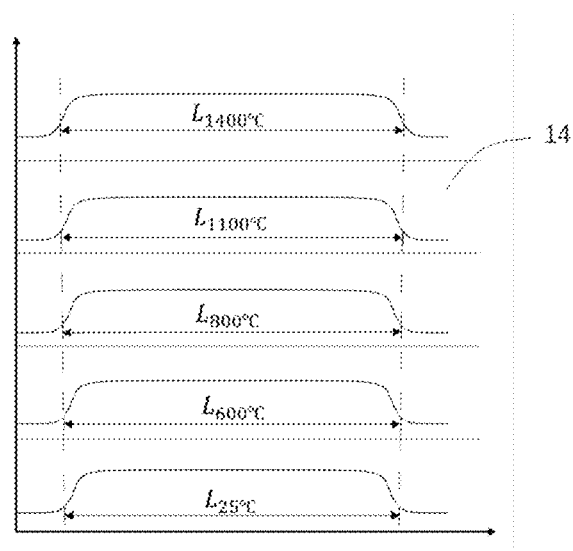
FIG. 8 is an infrared photoelectric signal data diagram of blade edges.

At the same height of the blade, the infrared photoelectric scanning signal 14 is collected at different temperatures, as shown in FIG. 8, wherein inflection points of infrared photoelectric scanning signals curve at different temperatures are calculated according to unified-standard slope changes. As a result, turbine blade width changes, namely axial displacement changes, can be further calculated based on calculation and identification of the inflection points on left and right sides of the curve according to a sampling rate of the photodetector and a rotation speed of the turbine blade during steady-state operation. At the same time, with the help of the probe telescoping function 6 and the probe rotating function 10 in the imaging process, edge displacement values of the target blade at different heights and temperatures can be collected.

Figure 9:
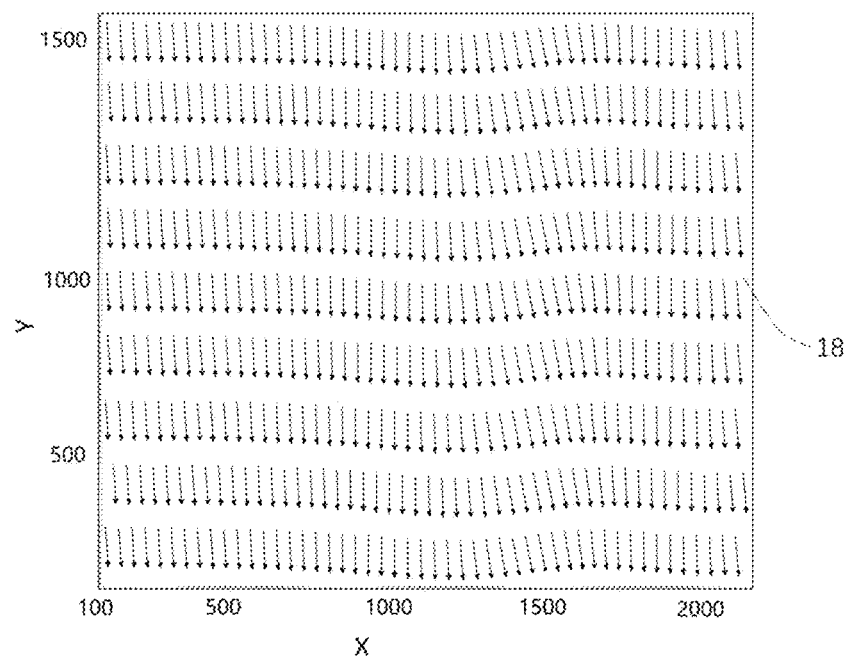
FIG. 9 illustrates blade strain field information data fusion.
Figure 10:
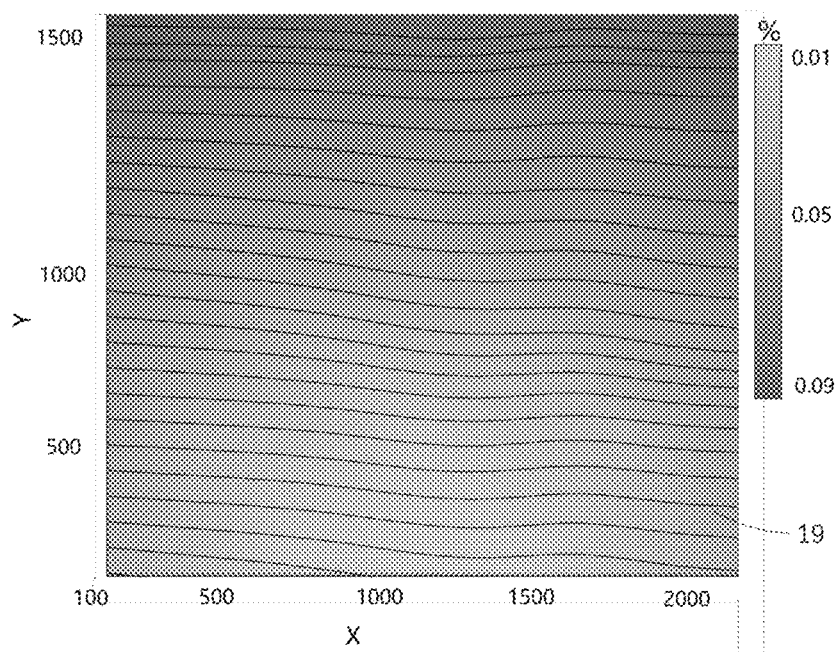
FIG. 10 is a sketch view of strain field reconstruction.

The blade edge displacement value calculated in the infrared mode is combined with the blade surface displacement vector diagram obtained in the imaging mode through an interpolation method, so as to obtain a blade surface displacement vector diagram in the steady-state operation, as shown in FIG. 9. Finally, based on a strain definition:

$$\varepsilon = \lim_{\Delta L \to 0} \Delta L / L,$$

as shown in FIG. 10, the strain field of the entire blade can be reconstructed.

What is claimed is:

1. A measurement and reconstruction method for a turbine blade strain field based on fusion of an imaging technology and an infrared photoelectric measurement technology, comprising steps of: using the imaging technology to perform digital image measurement and treatment on a strain of a blade surface area, and calculating a displacement change of the blade surface area based on blade surface feature points; using the infrared photoelectric measurement technology to collect infrared radiation signals at blade edges, and identifying a displacement change of the blade edges at different temperatures based on radiation intensity differences between blades and blade gaps; fusing data measured by the two technologies through interpolation to obtain a target blade overall displacement change distribution under a specific working condition, and reconstructing a blade full-field strain, wherein the two measurements are performed independently with one dual-mode probe.

2. The measurement and reconstruction method, as recited in claim 1, wherein in an imaging mode, a blade is evenly divided into multiple sub-areas according to a width of an imaging view field; during the measurement, the dual-mode probe is capable of telescoping and rotating functions; the telescoping function enables the dual-mode probe to sequentially image the multiple sub-areas of the blade under a small view field, and uses an image stitching technology to finish imaging measurement of the blade surface area; the rotating function enables the dual-mode probe to maintain a clear imaging focal length when facing different sub-areas of the blade; before the measurement, a telescoping distance and a rotating angle are determined according to geometric parameters of a target blade.

3. The measurement and reconstruction method, as recited in claim 1, wherein in an infrared mode, a telescoping function of the dual-mode probe is used to perform infrared radiation scanning of the blades and the blade gaps at a specific height and a specific environment when the blades rotate; an infrared photodetector is used to perform photoelectric conversion and voltage signal output, thereby identifying the displacement change of the blade edges based on the radiation intensity differences between the blades and the blade gaps.

4. The measurement and reconstruction method, as recited in claim 1, wherein the dual-mode probe transmits required optical information to an imaging optical path and an infrared optical path through a semi-transparent mirror; a charge-coupled CCD is connected to a rear end of the imaging optical path, and an infrared photodetector is connected to a rear end of the infrared optical path, both are replaceable according to specific engine environments and conditions.

5. The measurement and reconstruction method, as recited in claim 1, wherein the two technologies work independently during a measuring process, and collection is controlled by a charge-coupled CCD and an infrared photodetector at a rear end; data collected by a blade rotation speed sensor is also involved during the measuring process.

6. The measurement and reconstruction method, as recited in claim 1, wherein the displacement change of the blade edges measured in an infrared mode is fused with a displacement vector diagram of the blade surface area obtained in an imaging mode through interpolation, and a blade strain field is reconstructed based on an overall blade displacement vector diagram.

* * * * *